(No Model.)
G. W. PRICE.
CORN PLANTER.
No. 439,685. Patented Nov. 4, 1890.
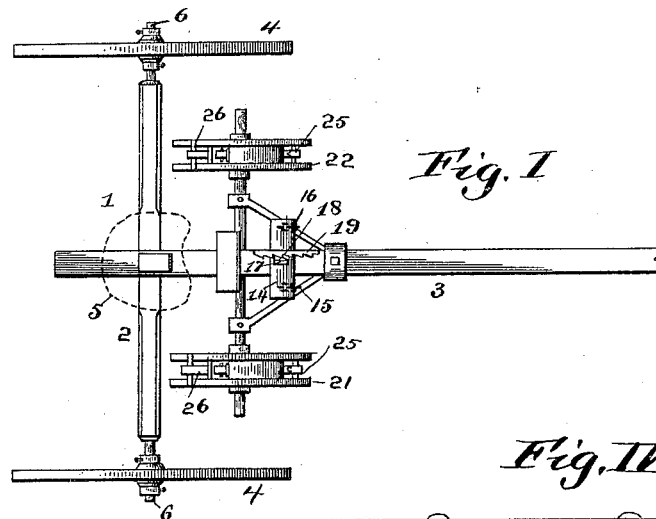
Fig. I
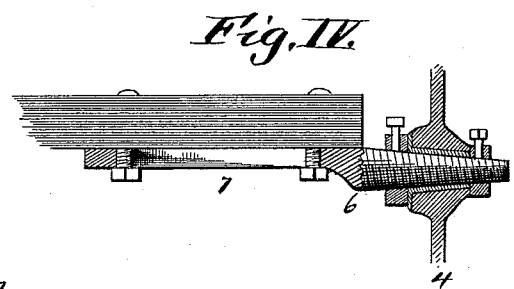
Fig. IV
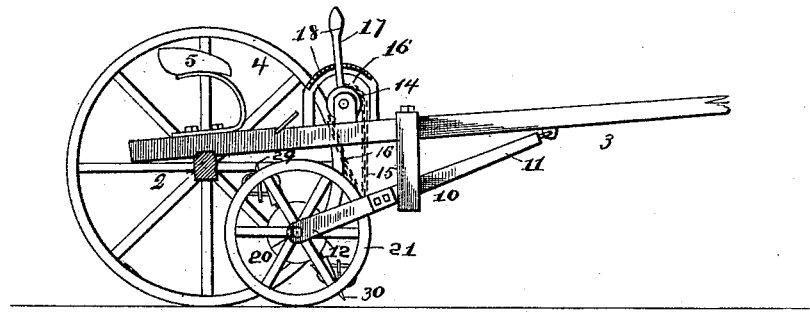
Fig. II
Fig. III
Fig. V
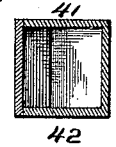
Witnesses:
J. B. McGirr.
Wm. J. Belt.
Inventor.
G. W. Price
By his Attorneys
Edson Bros.
THE NORRIS PETERS CO., PHOTO-LITHO., WASHINGTON, D. C.

UNITED STATES PATENT OFFICE.

GEORGE W. PRICE, OF LITTLE ORLEANS, MARYLAND.

CORN-PLANTER.

SPECIFICATION forming part of Letters Patent No. 439,685, dated November 4, 1890.

Application filed June 7, 1890. Serial No. 354,639. (No model.)

*To all whom it may concern:*

Be it known that I, GEORGE W. PRICE, a citizen of the United States, of Little Orleans, in the county of Alleghany and State of Maryland, have invented certain new and useful Improvements in Corn-Planters; and I do hereby declare the following to be a full, clear, and exact description of the invention, such as will enable others skilled in the art to which it appertains to make and use the same.

My invention relates to improvements in the corn-planter which forms the subject-matter of a prior patent granted to me March 25, 1890, No. 424,131; and the object of my present invention is to so construct and arrange the carrying and planting wheels of the machine that the aforesaid wheels serve to indicate the lines where the corn is to be planted and to enable the rows to be planted at varying distances apart; further, to arrange the planting-wheels in advance of the main axle, so as to be within view of the driver occupying the seat on the machine; further, to provide improved devices for lifting the planting contrivances clear off the ground with ease, so that the machine can be readily lifted by a boy, and, finally, to improve the parts in minor details with a view to promoting simplicity of construction and lessening the cost of manufacture of the machine.

With these and other ends in view my invention consists of the combination of devices and peculiar construction and arrangement of parts, as will be hereinafter fully described and claimed.

To enable others to understand my invention, I have illustrated the same in the accompanying drawings, in which—

Figure I is a plan view of a corn-planter constructed in accordance with my present invention. Fig. II is a side elevation of the machine. Figs. III and IV are detail views of the planting mechanism. Fig. V is a detail view of the stub-axle.

Referring to the drawings, in which like numerals of reference denote corresponding parts in all the figures, 1 designates the main carrying-frame of my improved corn-planter, which frame consists of the main axle 2, preferably made of wood, a tongue 3, and the carrying-wheels 4, which wheels are journaled on stub-axles or spindles 6, the main frame having a seat 5, which is arranged over or in rear of the main wooden axle and is designed to be occupied by the driver, who is enabled to readily manipulate the lever for adjusting the planting mechanism and has all the parts of the machine in full view before him. The stub-axles or spindles 6 are adjustably and rigidly secured on the main axle by means of clips 7, which embrace the spindles, and said spindles can be moved inward or outward in relation to the axle to vary the distance between the wheels and from the carrying-wheels with relation to the planting-wheels, presently described, so that the corn can be planted in rows of varying widths.

10 designates the supplemental adjustable frame for the planting-mechanism, which frame 10 has a short tongue 11 and a supporting-piece 12 at the rear end of the tongue 11. This tongue 11 is pivotally connected to the tongue 3 of the main frame, and the tongue and supporting-piece 12 are so proportioned that the rear end of said frame 10 terminates in advance of the main axle 2. The supporting-piece 12 of the supplemental frame has its parts or arms inclined at an angle to the tongue, and in the free ends of said supporting-piece 12 is journaled an axle 20, which carries the planting-wheels 21 22, one of said wheels being at one end of the axle 20 and the other wheel at the opposite end of said axle, and both wheels are arranged in advance of the main axle 2, so that the planting mechanism is within the view of the driver occupying the seat 5.

The supplemental frame and the planting mechanism carried thereby are adjustable vertically, so that the planting mechanism can be thrown out of use, and the means for accomplishing the elevation of the frame 10 and planting mechanism as contemplated by my present invention consists of a roller or drum 14, which is arranged transversely across the main tongue 3, above the same, and is journaled in suitable bearings or fixtures on said tongue 3. Around this roller or drum 14 passes the lifting-chains 15, which have a clevis 16, that takes into a hook on the roller, and the other ends of these lifting-chains are secured or fastened by a hook or other suitable contrivance to the pivoted tongue 11 of the supplemental adjustable frame. This roller is actuated by a lever 17, which is rigidly fixed to the end of the roller, and this lever is locked or confined in place by means of a lip or tooth 18 thereon, which lip projects or extends laterally from the lever and engages with one of a series of teeth formed on the lateral face of a fixed rack-bar 19, which may be either curved or straight, and is rigidly secured in any suitable way to the tongue 3.

The planting-wheels 21 22 are located or separated a distance equal to the width of the row it is desired to plant the seed or corn—as, for instance, they are four feet from each other—and the carrying-wheels 4 are separated or spaced from the planting-wheels a distance equal to one-half of the distance that the planting-wheels are from each other—as, for instance, the carrying-wheels are two feet from the planting-wheels or eight feet from each other; but I do not confine myself to this arrangement and proportion of parts, as the same can be modified without departing from the spirit of my invention. By this arrangement of parts, however, I am enabled to utilize the carrying-wheels to mark the lines where the corn is to be planted in the next succeeding row, which is very desirable.

The planting-wheels 21 22 are substantially the same in character as those shown and described in my earlier patent, hereinbefore referred to, to wit: Each wheel has a drum or hopper 24 around the hub of the wheel; two, three, four (more or less) delivery tubes or conduits 25 26; the blades or points 29 30; the movable side 31, pivoted to the rigid side; the pocket-plate 33, fixed to the movable side 31; the presser-foot 34, attached to the movable side 31 and extending beyond the periphery of the wheel; the regulating-slide 36, arranged transversely in the tube or conduit and in the path of the movable side 31; the spring 38 for normally closing the slide, which spring is preferably made of coiled wire; the covering-plate 39 above the slide 36, and the stop-plate 40 below the slide, all as shown.

In my improved planting mechanism I simply form a hole (one or more) in the drum or hopper and insert the seed tube or conduit therein, instead of forming a nozzle in the hopper and thrusting the nozzle in the tube, as in my earlier device. The movable point or blade which is attached to the movable side of the hopper has side flanges 41 42, (see Fig. IV,) which extend from said movable plate toward the fixed plate or blade, so as to close the sides of the conduit and prevent the escape of corn or seed through the sides of said conduit, the flanges 41 42 being formed by bending or striking up the metal of which the blade is made. The presser-foot is made of a single continuous piece of spring metal, instead of in sections, as heretofore, and both ends of the foot are attached to the movable side 31 of the planting device.

The operation of my device will be readily understood from the foregoing description, taken in connection with the drawings.

By making the tongue of the supplemental frame short and connecting it to the main tongue, so that the short tongue terminates in advance of the main wooden axle, I am enabled not only to keep the planting mechanism in full view of the operator, but also to prevent the tongue or pole of the machine from lifting when the planter is lifted clear off the ground, which is very desirable and advantageous.

It is evident that modifications in the form and proportion of parts can be made without departing from the principle or sacrificing the advantages of my invention.

Having thus described my invention, what I claim as new, and desire to secure by Letters Patent, is—

In a corn-planter, the combination of a main frame, the supplemental frame having its tongue pivotally attached to the pole and terminating in front of the axle of the main frame, the hopper and planting-wheels carried by the rear end of the supplemental frame in advance of the main axle, the roller journaled on the main frame and having a rope or chain attached to the bifurcated rear end of the supplemental frame to bodily lift the rear end of said supplemental frame and the planting-wheels, the spring or yielding lever fixed to one end of the roller and having the laterally-extending tooth or prong, and the stationary holding-bar fixed to the main frame and having the series of lateral teeth on one face of the same, all combined and arranged for service substantially as herein shown and described, for the purpose set forth.

In testimony whereof I affix my signature in presence of two witnesses.

GEORGE W. PRICE.

Witnesses:
H. I. BERNHARD,
WM. O. BELT.